US006959099B2

(12) United States Patent
Gutta et al.

(10) Patent No.: US 6,959,099 B2
(45) Date of Patent: Oct. 25, 2005

(54) METHOD AND APPARATUS FOR AUTOMATIC FACE BLURRING

(75) Inventors: Srinivas Gutta, Yorktown Heights, NY (US); Miroslav Trajkovic, Ossining, NY (US); Antonio J. Colmenarez, Maracaibo (VE); Vasanth Philomin, Hopewell Junction, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 690 days.

(21) Appl. No.: 10/011,612

(22) Filed: Dec. 6, 2001

(65) Prior Publication Data

US 2003/0108240 A1 Jun. 12, 2003

(51) Int. Cl.$^7$ .............................. G06K 9/00; G06K 9/36
(52) U.S. Cl. ...................... 382/100; 382/181; 382/264; 382/282; 704/246
(58) Field of Search ................................ 382/100, 118, 382/164, 181, 264, 282, 291; 704/231, 237, 239, 246, 251

(56) References Cited

U.S. PATENT DOCUMENTS

| 6,067,399 A | * | 5/2000 | Berger .......................... 386/46 |
| 2001/0000025 A1 | | 3/2001 | Darrell et al. ............... 382/103 |
| 2002/0081003 A1 | | 6/2002 | Sobol .......................... 382/118 |

FOREIGN PATENT DOCUMENTS

| AU | 9965253 A | * | 6/2000 | ............. G06T/5/00 |
| EP | 1107166 A2 | | 6/2001 | ............ G06K/9/00 |

OTHER PUBLICATIONS

Chen et al. "Using a Region–Based Blurring Method and Bits Reallocation to Enhance Quality on Face Region in Very Low Bitrate Video." Proc. of the 1998 IEEE Int. Symp. on Circuits and Systems, vol. 4, May 31, 1998, pp. 134–137.*

Forsyth and Fleck, "Identifying Nude Pictures", Proc. of the Third IEEE Workshop, Appl. of Computer Vision, 103–108, Dec. 2–4, 1996.

Elgammal et al, "Non–Parametric Model for Background Subtractin", in Proc. of the $6^{TH}$ European Conference on Computer Vision, pp. 751–767, Dublin Ireland, Jun./Jul. 2000.

* cited by examiner

Primary Examiner—Jon Chang
(74) Attorney, Agent, or Firm—Edward W. Goodman

(57) ABSTRACT

An image processing system is disclosed that provides automatic face or skin blurring for images. All faces or skin can be blurred, or specific faces can be blurred. In one aspect of the invention, a particular face is blurred on an image or on a series of images in a video. Faces are determined in an image, and face matching is performed to match a particular face to faces in the image. If a match is found, the face or a portion of the face is blurred in the image. The blurring is performed on a portion of the image containing the particular face. Blurring may be performed through a variety of techniques. In another aspect of the invention, voice processing is used as an adjunct to or in place of face analysis to determine if a face in an image or series of images should be blurred. In another aspect of the invention, all faces or human skin in an image or series of images is blurred.

12 Claims, 5 Drawing Sheets

METHOD AND APPARATUS FOR AUTOMATIC FACE BLURRING

FIELD OF THE INVENTION

The present invention relates to image processing techniques, and more particularly, to a method and apparatus for automatically blurring faces and human skin in images.

BACKGROUND OF THE INVENTION

Cameras are becoming ubiquitous in public and private areas. In public areas, cameras are being used for a variety of different and seemingly unrelated situations. For instance, retail stores use cameras to reduce shoplifting by customers and employees. As another example, many cities have cameras located at particular intersections or on particular highways, thereby providing real-time images of traffic. Additionally, another use for cameras in public places is face identification, which has been used at public events to capture wanted criminals.

Cameras are also becoming more popular in private areas, such as the home. Homemakers are using cameras to ensure that their children are properly cared for or for home security and surveillance purposes. Additionally, cameras are being integrated into home security systems, such that images from within a house can be transmitted to a monitoring facility if a home security system determines that something is amiss and that images should be sent.

The presence of cameras in these areas implicates privacy concerns. For example, in a shoplifting scenario, a criminal might be caught on video. However, other innocent shoppers may also be shown on the same video, and these people just happened to be in the store at the same time as the criminal. In a home situation, an intruder could enter the house when a security system is armed. The intruder, along with residents and guests in the house, could be caught in an image.

In these situations, there are people other than the criminal that are being shown on video. These people may or may not want to have their likeness on these videos.

There are some efforts to maintain privacy. For instance, on the television show "Cops," passersby and other individuals will have their faces blurred while the criminal and the police will not. This provides a way for bystanders to be blocked from view while the criminal, and any others allowing their likeness to be used, is not. However, this blurring is manually added to images in a video. This is a relatively long and tedious task.

A need therefore exists for a method and apparatus for automatically modifying an image sequence to contain blurred facial images for those selected individuals, such as those people who do not wish to have their identity known.

SUMMARY OF THE INVENTION

Generally, an image processing system is disclosed that provides automatic face or skin blurring for images. All faces or skin can be blurred, or specific faces can be blurred.

In one aspect of the invention, a particular face is blurred on an image or on a series of images in a video. Faces are determined in an image, and face recognition is performed to match a particular face to faces in the image. If a match is found, the face or a portion of the face is blurred in the image. The blurring is performed on a portion of the image containing the particular face. Blurring may be performed through a variety of techniques.

In another aspect of the invention, voice processing is used as an adjunct to or in place of face analysis to determine if a face in an image or series of images should be blurred.

In another aspect of the invention, all faces or human skin in an image or series of images is blurred.

A more complete understanding of the present invention, as well as further features and advantages of the present invention, will be obtained by reference to the following detailed description and drawings.

DETAILED DESCRIPTION

Figure 1:
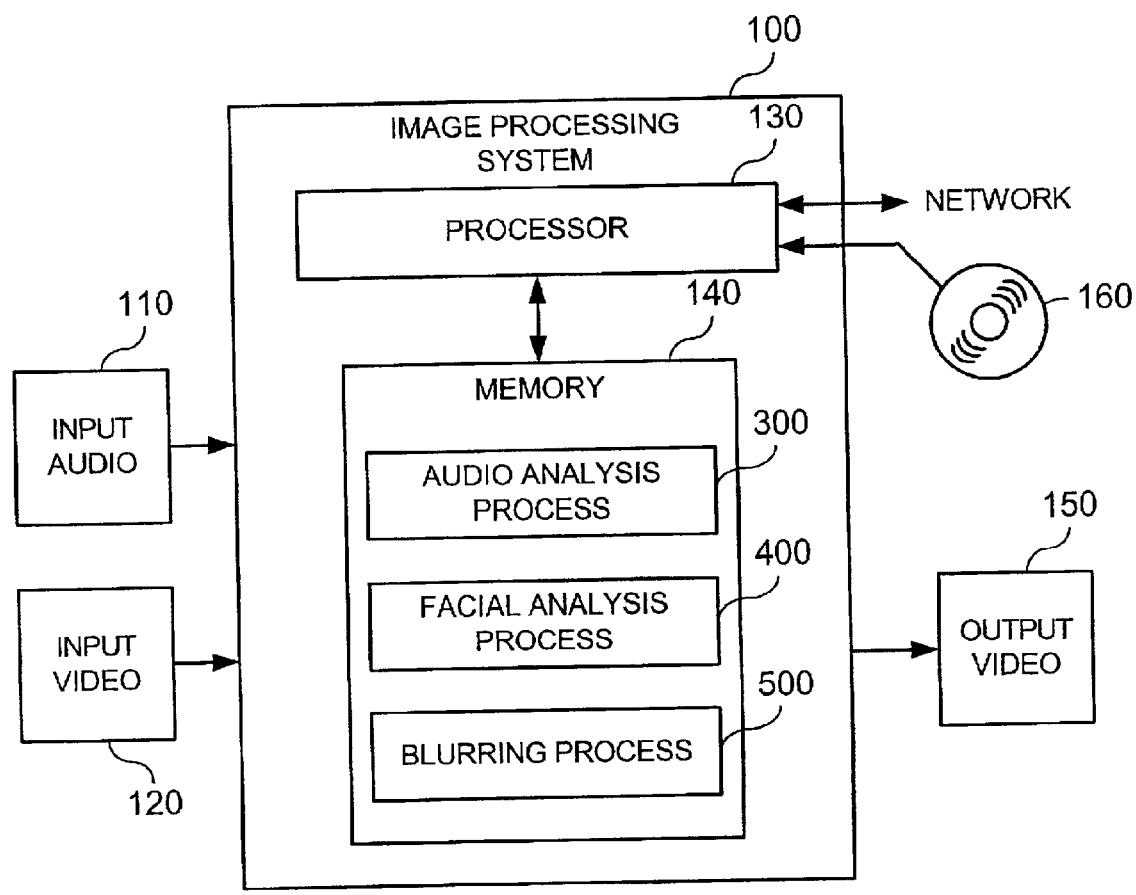
FIG. 1 illustrates an exemplary image processing system in accordance with the present invention.

FIG. 1 illustrates an exemplary image processing system 100 in accordance with the present invention. According to one aspect of the present invention, the image processing system 100 interacts with input audio 110, input video 120, and Digital Versatile Disk (DVD) 160, and produces output video 150.

The image processing system 100 may be embodied as any computing device, such as a personal computer or workstation, containing a processor 130, such as a central processing unit (CPU), and memory 140, such as Random Access Memory (RAM) and Read-Only Memory (ROM). In an alternate embodiment, the image processing system 100 disclosed herein can be implemented as an application specific integrated circuit (ASIC), for example, as part of a video processing system. As shown in FIG. 1, and discussed further below in conjunction with FIGS. 3 through 5, respectively, the memory 140 of the image processing system 100 includes an audio analysis process 300, a facial analysis process 400, and a blurring process 500. As known in the art, the processes 300, 400, and 500 can be combined into one process or made into even smaller processes. The processes 300, 400, and 500 are separated herein for ease of description and understanding.

Input audio 110 and input video 120 will usually be generated by a single camera with an attached microphone. However, the input audio 110 and input video 120 can be generated by separate devices. Additionally, input audio 110 is optional. Generally, input audio 110 and input video 120 will be digital. However, one or both of these signals can also be analog and image processing system 100 can use well known techniques to digitize the signals.

Generally, the audio analysis process 300 analyzes input audio 110 to determine if one or more particular speakers are speaking. If it is determined that one or more of the particular speakers are speaking, then all faces or potentially all human skin in an image or sequence of images is blurred. Additionally, a face, in an image, that corresponds to the particular speaker can be blurred and tracked. Audio analysis also helps facial analysis because, if a particular speaker is found, the facial analysis then can start with the premise that a face for the particular speaker should be found in the image.

The facial analysis process 400 determines human faces in images. The facial analysis process 400 determines locations in images for all human faces and can determine particular faces. Optionally, the facial analysis process 400 can determine the presence of human skin in images. The blurring process 500 blurs regions of images. The blurring process 500 will essentially blur regions of images containing particular faces, all faces, or all skin.

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks such as DVD 160, or memory cards) or may be a transmission medium (e.g., a network comprising fiber-optics, the world-wide web, cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk, such as DVD 160.

Memory 140 will configure the processor 130 to implement the methods, steps, and functions disclosed herein. The memory 140 could be distributed or local and the processor 130 could be distributed or singular. The memory 140 could be implemented as an electrical, magnetic or optical memory, or any combination of these or other types of storage devices. The term "memory" should be construed broadly enough to encompass any information able to be read from or written to an address in the addressable space accessed by processor 130. With this definition, information on a network is still within memory 140 of the image processing system 100 because the processor 130 can retrieve the information from the network.

Figure 2:
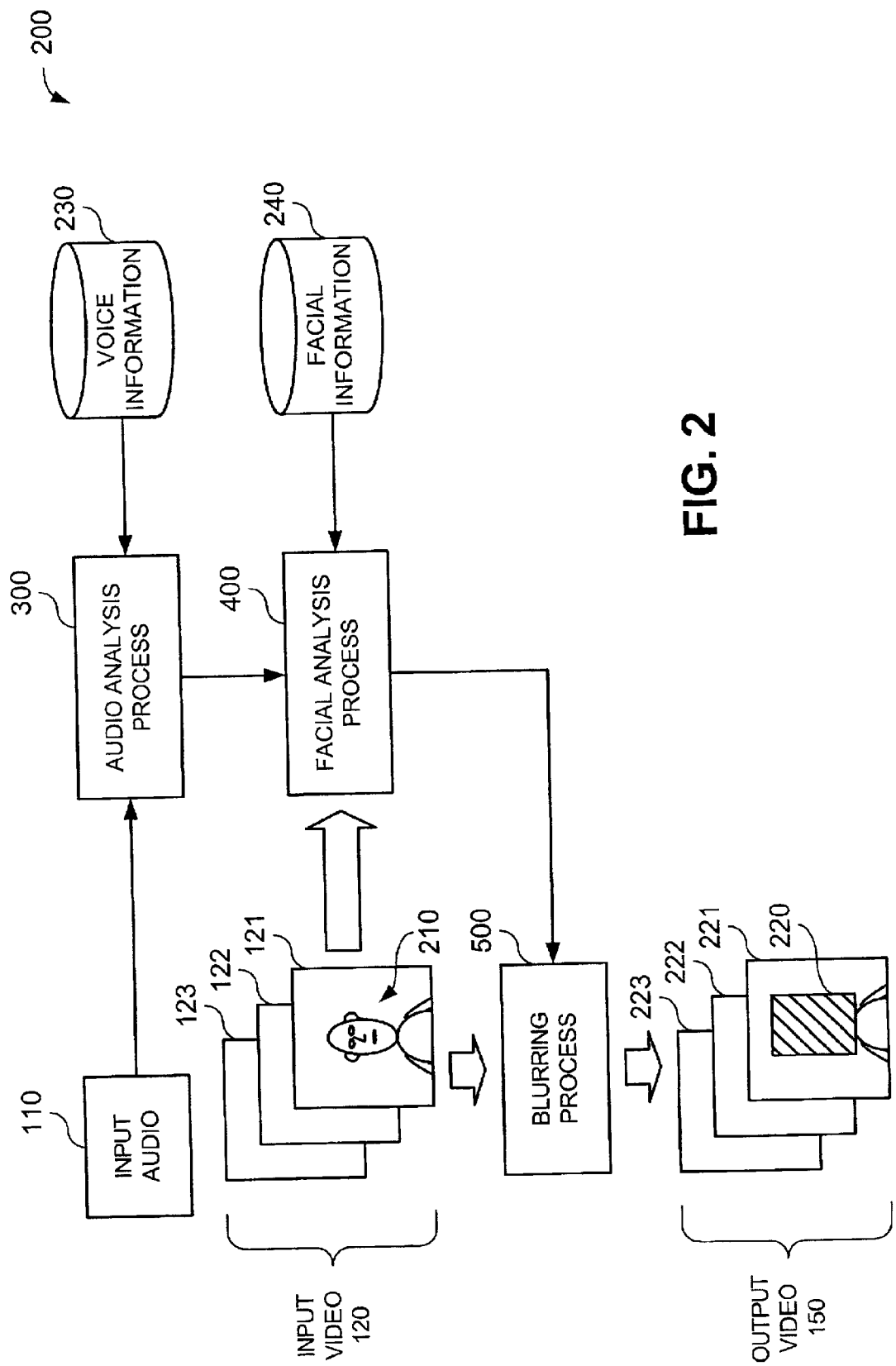
FIG. 2 illustrates a global view of the operations performed in accordance with the present invention.

FIG. 2 illustrates an illustrative global view of the operations performed by the present invention. As shown in FIG. 2, audio analysis process 300 accepts and analyzes input audio 110, using voice information 230. Audio analysis process 300 is described in detail in reference to FIG. 3. Voice information 230 allows audio analysis process 300 to determine if particular speakers are in input video 120. For instance, for a home security system, voices from inhabitants of the home will be collected for storage in the voice information 230 repository. For other systems, any person or persons who wish to have their privacy protected through the face blurring techniques of the present invention can have their voice information stored in voice information 230.

When audio analysis process 300 determines that all or a portion of audio input 110 belong to one of the particular speakers, the audio analysis process 300 provides this information to facial analysis process 400. Facial analysis process 400 is described in more detail in reference to FIG. 4.

Facial analysis process 400 analyzes input video 120, which comprises a series of images 121, 122, and 123 in this example. Facial analysis process 400 examines each image 121, 122, and 123 to determine faces in the image and the locations and, generally, the approximate size of the faces. The facial analysis process 400 may also determine particular faces in the image. Optionally, the facial analysis process may simply examine images 121, 122, and 123 to search for human skin.

To determine specific faces in images 121, 122, and 123, facial analysis process 400 uses facial information 240. The facial analysis process 400 provides data to blurring process 500 to inform blurring process 500 what regions of an image to blur. Blurring process is described in greater detail in reference to FIG. 5. Blurring process 500 then blurs specific regions of each image 121, 122, and 123. In this manner, blurring process 500 produces output video 150, which comprises images 221, 222, and 223. Output video 150 comprises images that have regions blurred, if certain conditions are met.

In the example of FIG. 2, image 221 has region 220 blurred. Image 121 is a representation of an image before blurring takes place, and image 221 is a representation of this same image after blurring has been performed by blurring process 500. Region 220, in this example, blurs all of the face 210. However, portions, such as the eyes, of the face may be blurred instead. Additionally, all human skin in an image may be blurred, if desired.

Figure 3:
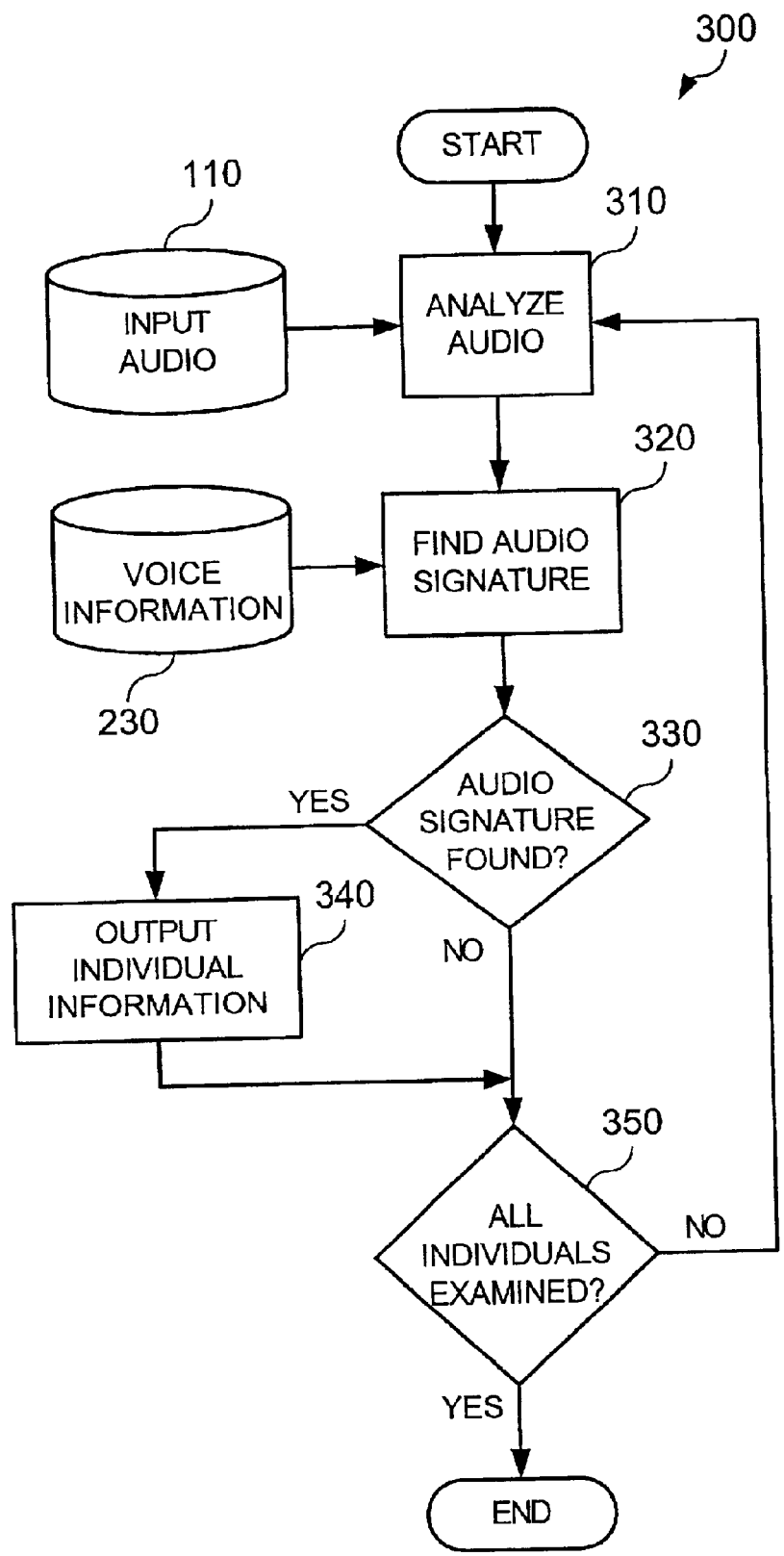
FIG. 3 is a flow chart describing an exemplary implementation of the audio analysis process of FIG. 1.

FIG. 3 is a flow chart describing an exemplary implementation of the audio analysis process 300. As previously indicated, the audio analysis process 300 analyzes input audio 110, using voice information 230, to determine if specific speakers are in images. Generally, audio analysis process 300 performs speaker identification by using audio. There are a variety of techniques for speaker identification through audio. Each of the following U.S. patents describes speaker identification by using audio, and each of these is hereby incorporated by reference: U.S. Pat. No. 6,246,987, entitled "System for permitting access to a common resource in response to speaker identification and verification"; U.S. Pat. No. 6,233,555, entitled "Method and Apparatus for Speaker Identification Using Mixture Discriminant Analysis to Develop Speaker Models"; U.S. Pat. No. 6,141,644, entitled "Speaker Verification and Speaker Identification Based on Eigenvoices"; U.S. Pat. No. 6,029,124, entitled "Sequential, Nonparametric Speech Recognition and Speaker Identification"; and U.S. Pat. No. 5,946,654, entitled "Speaker Identification Using Unsupervised Speech Models."

Method 310 starts in step 310, when the input audio 110 is analyzed. Generally, methods for speaker identification extract some type of information from the audio 110 (step 310), and this extracted information is compared (step 320) with stored voice information 230 from a speaker to determine a match within some predetermined accuracy.

For instance, in U.S. Pat. No. 6,233,555, the voice information 230 is derived from two phases. In the enrollment phase a password utterance from a speaker is received multiple times. A transcription of the password utterance as a sequence of phones is obtained, and the phone string is stored in a database containing phone strings of other speakers in the group. In the training phase, the first set of feature vectors are extracted from each password utterance and the phone boundaries for each phone in the password transcription are obtained using a speaker independent phone recognizer. A mixture model is developed for each phone of a given password from a speaker. Then, using the feature vectors from the password utterances of all of the speakers in the group, transformation parameters and transformed models are generated for each phone and speaker, using mixture discriminant analysis. The transformation parameters and transformed models are stored as voice information 230.

The process in U.S. Pat. No. 6,233,555 then continues as follows. An utterance from a speaker is received from input audio 110 and a sequence of a first set of feature vectors are computed based on the received utterance (step 310). The first set of feature vectors are then transformed into a second set of feature vectors using transformations specific to a particular segmentation unit (step 310), and likelihood scores of the second set of feature vectors are computed using speaker models (stored in voice information 230) trained using mixture discriminant analysis (step 310). The likelihood scores are then combined to determine an utterance score and the identity of a speaker is validated based on the utterance score (step 320).

Those skilled in the art will realize that there are a variety of techniques suitable for speaker identification.

If an audio signature is found (step 330=YES), which means that a speaker has been identified within a predetermined degree of accuracy, then information that indicates a particular speaker is output. This occurs in step 340.

It may be that it is possible to track a single speaker. For instance, if a camera is able to view an entire room where only one person is speaking, then the audio analysis could determine that the audio is from a speaker whose voice information has been stored in voice information 230. Once the identity of the speaker is determined, it is possible to use tracking techniques to track the person while the person remains in view of a camera.

It is also possible to determine that a person or persons in a room do not correspond to people who have their voice information stored in voice information 230. If another person enters the room whose audio signature can be determined in step 320, a system can then use tracking techniques to track this person. One commonly used tracking technique models the background, then determines what objects are moving by comparing new images with the modeled background. Such a technique is described in Elgammal A., Harwood D. and Davis L., "Non-Parametric Model for Background Subtraction," Proc. of the 6th European Conf. on Computer Vision, 751–767, Dublin, Ireland, June/July 2000, the disclosure of which is incorporated herein by reference.

In these situations, particular individual information 340 can include who the person is and what time he or she entered the view of a camera. This will help the facial analysis techniques, to be discussed below, because one or more people will be known to be present in the view of a camera.

Optionally, in step 340, the fact that a particular speaker was found is output instead of specific information about the person. This situation is particularly useful if all faces are to be blurred if the voice signature of one person is found. The latter can be a setting that a user can enable or disable.

If all of the voice information for all individuals have not been examined (step 350=NO), then the audio analysis process 300 proceeds again in step 310. Optionally, step 310 is performed once each time audio analysis process 300 is performed, and step 350 begins again in step 320. If all the information for all individuals have not been examined (step 350=NO), then the audio analysis process 300 stops.

Figure 4:
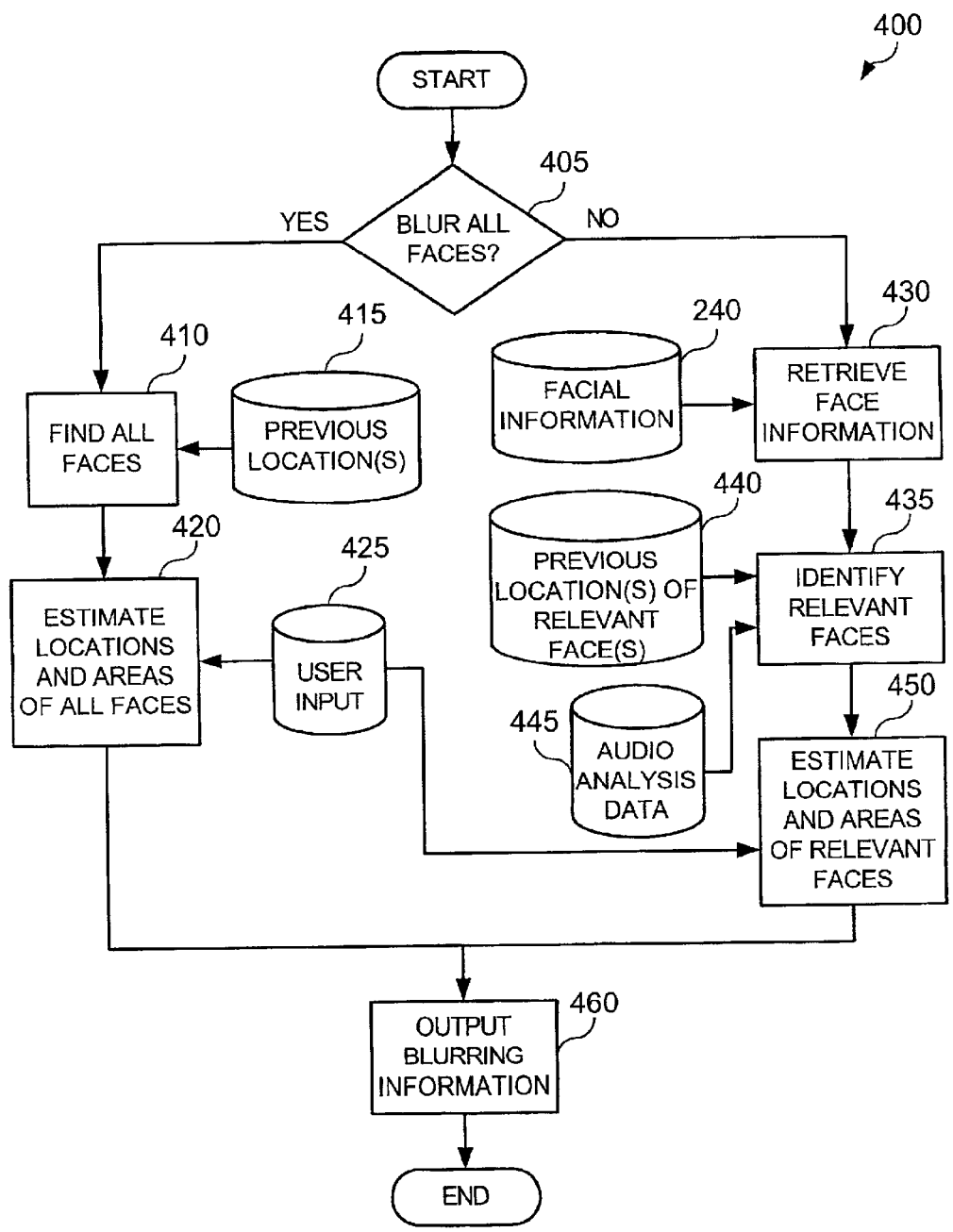
FIG. 4 is a flow chart describing an exemplary implementation of the facial analysis process of FIG. 1.

As shown in FIG. 4, the facial analysis process 400 begins in step 405, when it is determined if a user has selected the option of blurring all faces in images. If this option has been selected (step 405=YES), all faces are detected in step 410. The face detection may be performed in accordance with the teachings described in, for example, International Patent WO9932959, entitled "Method and System for Gesture Based Option Selection," assigned to the assignee of the present invention, Damian Lyons and Daniel Pelletier, "A Line-Scan Computer Vision Algorithm for Identifying Human Body Features," Gesture'99, 85–96 France (1999), Ming-Hsuan Yang and Narendra Ahuja, "Detecting Human Faces in Color Images," Proc. of the 1998 IEEE Int'l Conf. on Image Processing (ICIP 98), Vol. 1, 127–130, (October, 1998); and I. Haritaoglu, D. Harwood, L. Davis, "Hydra: Multiple People Detection and Tracking Using Silhouettes," Computer Vision and Pattern Recognition, Second Workshop of Video Surveillance (CVPR, 1999), each incorporated by reference herein.

Many of these techniques require training, where the training is performed by having a camera view of an empty room to determine base data. Faces and movement are then more easily determined. These techniques are well known to those skilled in the art.

Detecting all faces 410 can be made easier by using previously stored locations of faces 415. Every time facial analysis process 400 can store current locations of faces in storage 415 and then use these locations when the facial analysis process 400 is executed the next time.

Once all faces are found in step 410, the "locations" and areas of faces are estimated. The estimated locations are generally central locations of an outline of the face, and the outline of the face generally corresponds to the estimated area. The estimated locations can be influenced by user input 425. For example, a user could choose to have step 420 use ellipses to estimate areas of the face. The location of the face is then the center point of an ellipse and the ellipse can be tilted in such a way as to encompass the entire face. Techniques for estimating head tilt and other parameters are given in the U.S. patent application having Ser. No. 09/898,139, entitled "Method and Apparatus for Interleaving a User Image in an Original Image Sequence," filed on Jul. 3, 2001, by Gutta et al., the disclosure of which is incorporated by reference herein.

As another example, a user may wish to have area estimated with rectangles or other shapes. Rectangles may be useful, for instance, to ensure that the face and part of the hair are blurred in subsequent stages. As with ellipses, rectangles and other shapes can be appropriately tilted to provide the best estimate of facial area.

After step 420, the facial analysis process 400 outputs blurring information in step 460. Such blurring information includes positions and areas of all faces, where the area is generally described through mathematical shapes such as ellipses or rectangles.

If the option to blur all faces is disabled (step 405=NO), then face information is retrieved from facial information repository 240. This occurs in step 430. In step 435, relevant faces are identified. A "relevant" face is simply a face that is to be blurred if the face is found to a predetermined degree of accuracy in an image. Generally, step 435 comprises two steps: face detection and then face recognition. For this version of step 435, generally movement is detected first, which involves background analysis, then do face detection on the object is performed. Another technique, which may be used in step 435, is to classify a object in the image and determine that the object is a human being. Classification of objects is described in Srinivas Gutta and Vasanth Philomin, "Classification of Objects through Model Ensembles," U.S. Ser. No. 09/794443, filed Feb. 27, 2001, the disclosure of which is incorporated by reference herein. After it is determined that the object is human, the system can detect a face and recognize the face.

As described above, there are a variety of techniques for face detection. There are also a variety of techniques for face recognition. The face recognition may be performed in accordance with the teachings described in, for example, Antonio Colmenarez and Thomas Huang, "Maximum Likelihood Face Detection," 2nd Int'l Conf. on Face and Gesture Recognition, 307–311, Killington, Vt. (Oct. 14–16, 1996) or Srinivas Gutta et al., "Face and Gesture Recognition Using Hybrid Classifiers," 2d Int'l Conf. on Face and Gesture Recognition, 164–169, Killington, Vt. (Oct. 14–16, 1996), incorporated by reference herein.

Audio analysis data 445, which is the output of audio analysis process 300, can also be used to determine that there is at least one person whose face should be blurred. This information can also contain information on who the person is This enables step 435 to more easily perform face recognition. Additionally, if there is only one face in the view of the camera, then face recognition need not be performed. It should be noted that audio analysis data 445 may indicate that all faces are to be blurred once the audio signature of a single person is found. In this case, step 435 will act to find all faces and step 450 will act to provide location and area information for all faces.

It should also be noted that facial analysis process 400 can be simplified in certain situations by using previous locations of relevant faces 440. This will reduce the amount of processing by step 435 because the current location of a relevant face should be close to the previous location of a relevant face.

In step 450, the locations and areas of relevant faces are estimated and output information for relevant faces is output in step 460. Note that there may be no output information if no relevant faces are found. Method facial analysis process 400 then ends after step 460.

It should be noted that method 400 can optionally be used to determine human skin and then to blur the skin. This could be helpful, for instance, if a person in a video is inappropriately dressed. An exemplary way of modifying method 400 to blur human skin is as follows. In step 405, it is determined that all human skin is to be blurred. In step 410, all human skin is found in an image. Human skin can be found through various techniques, such as the techniques described in Forsyth and Fleck, "Identifying Nude Pictures," Proc. of the Third IEEE Workshop, Appl. of Computer Vision, 103–108, Dec. 2–4, 1996, the disclosure of which is incorporated by reference herein. Step 410 can use previously stored location 415.

In step 420, locations and areas of the human skin are determined, and this step may be affected by user preferences 425. The locations and areas are output in step 460. Again, it is possible to use shapes to describe the areas of the image containing skin. Alternatively, it is also possible, in step 460, to create an output that will cause certain pixels in the image to be blurred. For example, a bitmap could be created that contains one bit for every pixel in the image could be created, where a "1" in the bitmap indicates that the pixel is to be blurred and a "0" in the image indicates that the pixel is not to be blurred. The present invention can use any technique suitable for indicating which pixels in an image should be blurred.

Figure 5:
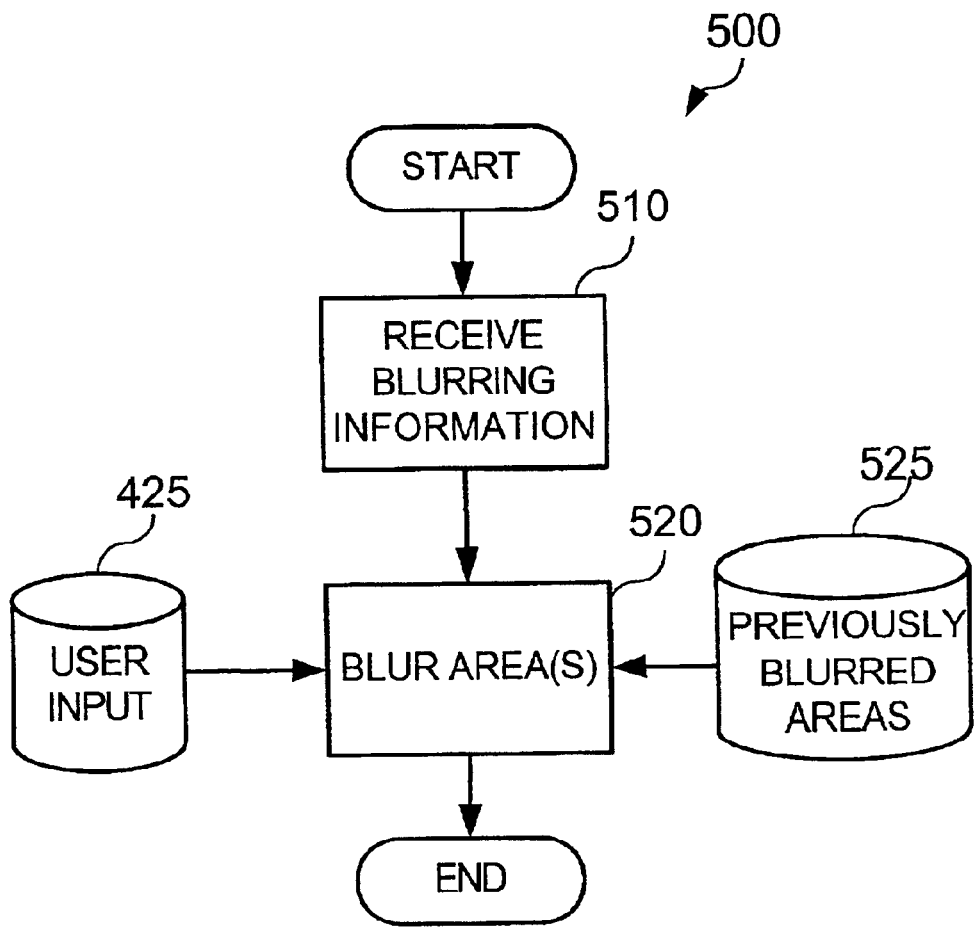
FIG. 5 is a flow chart describing an exemplary implementation of the blurring process of FIG. 1.

FIG. 5 is a flow chart describing an exemplary implementation of the blurring process 500. As previously indicated, the blurring process 500 blurs regions of an image. Generally, these regions of the image correspond to faces. Blurring process 500 begins in step 510, when blurring information is received. Such blurring information generally comprises sets of locations and areas. The locations are generally the center point of the area, and the area is generally described mathematically. This mathematics can include shapes and orientations for the shapes.

In step 520, the blurring process 500 blurs regions of an image by using the blurring information. The regions can be modified by user input. For instance, a user can make the region be larger or smaller, or can choose different shapes. Previous blurring information is stored in previously blurred areas storage 525. This storage can be used to save user settings and to provide a "blur-only image" that can be combined with an input image to more easily provide the output blurred image. The blur-only image maps to the input image and provides locations to be blurred or perhaps pixel data to add to or subtract from the pixels that already exist.

Additionally, the user input 425 can provide information on how the blurring should be performed. As is known in the art, there are a variety of techniques useful for blurring. For instance, an average could be determined from certain pixels. The average is then output to the pixels to be blurred.

It is to be understood that the embodiments and variations shown and described herein are merely illustrative of the principles of this invention and that various modifications may be implemented by those skilled in the art without departing from the scope and spirit of the invention.

What is claimed is:

1. A method for automatically blurring faces, said method comprising the steps of:
   storing voice information of at least one relevant person;
   analyzing an image to determine at least one face in the image, the image being one image in a series of images from a video;
   determining if sound in audio corresponding to the video can be assigned to a relevant person by comparing information in the sound with the stored voice information; and
   blurring at least one region of the image containing at least a portion of the at least one face, said blurring step comprising blurring regions of each of the images when the audio corresponds to a relevant person, each of the regions comprising one of the at least one faces, such that all faces in the images are blurred.

2. The method as claimed in claim 1, wherein the method further comprises the step of:
   storing face information identifying at least one relevant face,
   wherein the at least one face comprises a plurality of faces,
   wherein the step of analyzing further comprises the step of identifying at least one relevant face from the plurality of faces by comparing face information of said determined at least one face with said stored face information, and
   wherein the step of blurring further comprises blurring a region of the image containing at least a portion of the at least one relevant face.

3. The method as claimed in claim 1, wherein:
   the step of blurring further comprises the step of blurring a region of each of the images when the audio corresponds to a relevant person, each of the regions comprising a face that corresponds to the relevant person.

4. The method as claimed in claim 1, wherein a particular region comprises a face, and wherein the step of blurring further comprises blurring a portion of the region where the entire face is blurred.

5. The method as claimed in claim 1, wherein the step of analyzing further comprises the step of determining, for each face in the image, a location of the face.

6. The method as claimed in claim 5, wherein the step of determining a location further comprises the step of determining, for each location, an area.

7. The method as claimed in claim 6, wherein each area comprises a shape.

8. The method as claimed in claim 1, wherein:

the at least one face comprises a plurality of faces;

the step of analyzing further comprises the step of identifying regions in the image wherein the plurality of faces exist; and the step of blurring further comprises blurring each of the regions so that each of the plurality of faces is blurred.

9. A system for automatically blurring faces, said system comprising:

an input for receiving an image in a series of images from a video;

a first memory for storing computer-readable code;

a second memory for storing voice information of at least one relevant person; and a processor operatively coupled to said first and second memories, said processor configured to implement said computer-readable code, said computer-readable code causing said processor:

analyze said image to determine at least one specified human body feature in the image;

determine if sound in audio corresponding to the video can be assigned to a relevant person by comparing information in the sound with the stored voice information; and blur at least one region of the image containing at least a portion of the at least one specified human body feature when the audio corresponds to a relevant person.

10. The system as claimed in claim 9, wherein the at least one specified human body feature comprises a portion of a face.

11. The system as claimed in claim 9, wherein the at least one specified human body feature comprises human skin.

12. An article of manufacture comprising:

a computer-readable medium having computer readable code means embodied thereon, said computer-readable program code means causing a processor to perform the steps of:

storing voice information of at least one relevant person;

analyzing an image to determine at least one face in the image, the image being one image in a series of images from a video;

determining if sound in audio corresponding to the video can be assigned to a relevant person by comparing information in the sound with the stored voice information; and blurring at least one region of the image containing at least a portion of the at least one face, said blurring step comprising blurring regions of each of the images when the audio corresponds to a relevant person, each of the regions comprising one of the at least one faces, such that all faces in the images are blurred.

* * * * *